United States Patent [19]

Pawlak et al.

[11] 4,049,629

[45] Sept. 20, 1977

[54] SOLUTION POLYCONDENSATION METHOD

[75] Inventors: Joseph A. Pawlak, Cheektowaga; Anthony L. Lemper, Amherst; Victor A. Pattison, Clarence Center, all of N.Y.

[73] Assignee: Hooker Chemicals & Plastics Corporation, Niagara Falls, N.Y.

[21] Appl. No.: 542,644

[22] Filed: Jan. 20, 1975

[51] Int. Cl.$^2$ .................. C08G 63/22; C08G 63/18
[52] U.S. Cl. .................. 260/47 C; 260/49; 260/860
[58] Field of Search .................. 260/75 M, 47 C, 49, 260/860

[56] References Cited

U.S. PATENT DOCUMENTS

| 3,037,960 | 6/1962 | Frazer | 260/860 |
| 3,160,602 | 12/1964 | Kantor et al. | 260/47 C |
| 3,498,950 | 3/1970 | Shatz et al. | 260/47 C |
| 3,702,838 | 11/1972 | Wilson | 260/47 C |
| 3,972,852 | 8/1976 | Inata | 260/47 C |

FOREIGN PATENT DOCUMENTS 1,366,232  6/1964  France

OTHER PUBLICATIONS

Polyesters, vol. 1, Saturated Polymers, Goodman and Rhys. (1965) American Elsevier Pub. Co. N.Y.C. pp. 13 to 37.

Primary Examiner—V. P. Hoke
Attorney, Agent, or Firm—Peter F. Casella; James F. Mudd

[57] ABSTRACT

High molecular weight, linear aromatic polyesters are produced in an improved solution polycondensation process in which the hydroxyl component is added to the acid halide.

8 Claims, No Drawings

SOLUTION POLYCONDENSATION METHOD

BACKGROUND OF THE INVENTION

High molecular weight linear polyester compositions based on bisphenols have been shown to be useful in the preparation of films and fibers. These compounds, when molded into useful articles using conventional techniques, offer properties superior to those articles molded from other linear polyester compositions.

Bisphenol polyesters can be prepared by three condensation techniques, i.e., melt homogeneous and interfacial condensation techniques. Melt or bulk polymerization is the simplest method and in this technique the reactants are charged into a vessel and heated. Homogeneous or solution polymerization generally offers a better rate of reaction and temperature control than the melt process since solubility of all reactants in a common solvent permits the reactants to be more thoroughly dispersed and the resulting product is more conveniently handled. In the interfacial method, the reactants are dissolved in solvents which are immiscible with each other and their reaction takes place at the interface of the solvents.

Of the three condensation techniques, homogeneous or solution polymerization is the least often used for two reasons. The first is that the interfacial technique provides all of the advantages of the homogeneous technique and additionally provides means for maintaining the concentration of the reacants in the reaction zone at a constant level. The second reason is that it is difficult to produce high molecular weight polymers by solution polymerization while such high molecular weight products ar easily obtained using either the melt or interfacial techniques. Thus, in solution polymerization, the product rarely hs an intrinsic viscosity in excess of 0.6 deciliter per gram of polymer when measured in a solution of symmetrical tetrachloroethane at 30° C., and indeed, most polymers produced by this method have intrinsic viscosities of less than about 0.4 dl/g. The intrinsic viscosity is, of course, a measure of the molecular weight of the product and as the molecular weight decreases, the polyesters become more brittle and lose strength. Thus, the molecular weight of the polyesters produced by the solution process are usually not high enough to produce a polyester having good impact strength.

The interfacial technique has several disadvantages. One is the possibility of hydrolysis of some of the diacid chloride and formation of carboxylic acid groups which can then react with more diacid chloride forming anhydride linkages in the growing polymer. Exposure to moisture during processing and/or use can result in hydrolysis of the anhydride linkage which could seriously degrade polymer properties. In a solution method, moisture can be excluded by careful drying of all ingredients and solvents by known methods such as distillation, azeotropic distillation of drying of solids in suitable equipment such as vacuum ovens. Also in a solution polymerization method, if the hydroxyl-containing compound reacts very rapidly with the diacid chloride it may not be necessary to eliminate the very small amount of water that may be present as an impurity. In an interfacial process, large amounts of water are always present and thus the probability of reaction with the dihalide is increased. Another disadvantage of the interfacial process is the low yield per batch of 3%-5% polymer solids while the solution method affords up to 11% polymer solids per batch.

In the solution condensation of a bisphenol and an aromatic dicarboxylic acid halide, it is known to add the dihalide to the bisphenol or glycol or to mix the two reactants followed by addition of a suitable catalyst, and in some instances to initially employ one diol so as to form a prepolymer and thereafter and the second diol. See, e.g., Korshak et al, J. Poly. Sci., A-1, 11, 2209 (1973). The addition of the aromatic dicarboxylic acid halide to the hydroxyl-containing component is standard procedure.

We have now discovered that despite the reasons for the standard practice in the art of adding the diacid halide to the hydroxyl-containing component, if the hydroxyl-containing component is added to the diacid halide, solution polymerization will yield high molecular weight polyesters which have a low melt viscosity and, additionally, the yield per volume of reactants and sovlents can be improved. We have also found that the high temperature prepolymerization step generally employed in the interfacial method and sometimes employed in the solution polymerization process can be eliminated.

Accordingly, it is the object of this invention to provide a new process for the production of high molecular weight polyesters having a low melt viscosity and an improved yield per volume of reactants and solvents by the solution or homogeneous polymerization technique. This and other objects of the invention will become apparent to those skilled in the art from the following detailed description.

SUMMARY OF THE INVENTION

This invention relates to a solution of polymerization process for the production of high molecular weight, linear aromatic polyesters and more particularly to a process in which the hydroxyl-containing component is added to the diacid halide.

DESCRIPTION OF THE PREFERRED EMBODIMENTS

In accordance with the present invention, a solution polymerization process for the production of linear aromatic polyesters is carried out by adding the hydroxyl-containing component to the diacid halide under polymerization conditions.

The diacid halides which can be used in the present invention include chloride and diacid halides of the formula

X-Y-Z-Y'-X wherein Z is a bivalent or disubstituted radical of 1 to about 20 carbon atoms selected from the group consisting of alkylene, arylene, cycloalkylene, alkylarylene, and arylene-B-arylene where B is —O—, —S—, —SO—, —SO$_2$—,—SO$_3$—, —CO—,

GN<, or alkylene; Y and Y' are independently selected from the group consisting of CO, SO, SO$_2$; and X is halogen. G is defined hereinafter with respect to the bisphenols. Additionally, mixtures of the diacid halides may be employed to achieve a polymer with especially desired properties.

Among aromatic disulfonyl halides which can be used in the polycondensation reaction according to the invention are: 1,4-benzene disulfonyl chloride; 1,3-benzene disulfonyl chloride; 1,2-benzene disulfonyl chloride; 2,7-naphthalene disulfonyl chloride; 4,4'-diphenyl disulfonyl chloride; 4,4'-diphenyloxide disulfonyl chloride; 4,4'-diphenylmethane disulfonyl chloride; 4,4'-diphenylsulfone disulfonyl chloride; 3,3'-diphenylsulfone disulfonyl chloride; bis-(4-chlorosulfonylphenyl)-2,2'-propane; 4,5-dichloro-1,3-benzene disulfonyl chloride; 4,6-dichloro-1,3-benzene disulfonyl chloride; and 4,5,6-trichloro-1,3-benzene disulfonyl chloride.

Among the diacid halides of dicarboxylic acids which can be used according to the invention are: terephthaloyl chloride; isophthaloyl chloride; sebacoyl chloride; adipoyl chloride; 4,4'-diphenylether dicarboxylic acid chloride; fumaryl chloride; and maloeyl chloride.

Diacid halides of aromatic monocarboxysulfonic acids include m-chlorosulfonylbenzoyl chloride; p-chlorosulfonylbenzoyl chloride; and 2-sulfonylchloride-1-naphthyl chloride.

Other typical examples include the acid chlorides of bis(4-carboxyphenyl)-sulfone; bis(4-carboxyphenyl)-carbonyl; bis(4-carboxyphenyl)-methane; bis(4(4-carboxy)-diphenyl. 1,2- and 1,1-bis(4-carboxyphenyl)-ethane; 1,1- and 2,2bis(4-carboxyphenyl)-propane; 1,1- and 2,2-bis(3-carboxyphenyl)-propane; 2,2-bis(4-carboxyphenyl)-1,1-dimethyl-propane; 1,1- and 2,2-bis(4-carboxyphenyl)-butane; 1,1- and 2,2-bis(4-carboxyphenyl)-pentane; 3,3-bis(4-carboxyphenyl)-heptane; 3,3-bis(3-carboxyphenyl)heptane; and bis((4-carboxy)-diphenxl.

Although the preferred chlorides have been listed above, the other halides, especially the bromides but also for the fluorides and iodides, may be suitably substituted for the chloride to obtain good results.

The hydroxyl-containing component used in the present invention is either a bisphenol or a mixture of a bisphenol and a glycol.

The bisphenols considered useful for the preparation of high molecular weight polyesters according to the present invention correspond to the general formula:

$$\text{HO}-\text{Ar}-\text{E}_d-\text{Ar}-\text{OH}$$
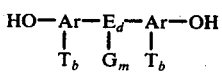

wherein Ar is aromatic, preferably containing 6–18 carbon atoms (including phenyl, biphenyl and naphthyl), G is selected from the group consisting of alkyl, aryl, haloaryl, haloalkylaryl, alkylaryl, cycloalkyl, halocycloalkyl, and haloalkyl, and suitably contains 1–4 carbon atoms; E is a bivalent (or disubstituted) radical selected from the group consisting of alkylene, haloalkylene, cycloalkylene, halocycloalkylene, arylene, haloarylene, —O—, —S—, —SO—, —SO$_2$—, —SO$_3$—, —CO—,

and GN<, and preferably contains 1–14 carbon atoms T is selected from the group consisting of halogen, G or OG, Cl and Br being preferred halogens; m is 0 to the number of replaceable hydrogen atoms on E; b is 0 to the number of replaceable hydrogen atoms on Ar; and d is 0 or 1. When there is a plurality of G and T substituents in the bisphenols according to the above formula, these substituents may be the same or different. The I substituents may occur in the ortho-, meta-, or para-position with respect to the hydroxyl radical. Additionally, mixtures of the above described bisphenols may be employed to achieve a polymer with especially desired properties. The bisphenols can contain 12 to about 30 carbon atoms, preferably 12 to about 25 carbon atoms.

Bisphenols having the above general formula and which are suitable for being applied according to the present invention include, but are not limited to, bis(4-hydroxyphenyl)-methane, bis(3-methyl-4-hydroxyphenyl)-methane, bis(4-hydroxy-3,5-dichlorophenyl)-methane, bis(4-hydroxy-3,5-dibromophenyl)-methane, bis(4-hydroxy-3,5-difluorophenyl)-methane, bis(4-hydroxyphenyl)-2,2-propane [common name - bisphenol-A], bis(3-chloro-4-hydroxyphenyl)-2,2-propane, bis(4-hydroxy-3,5-dichlorophenyl)-2,2-propane, bis(4-hydroxynaphthyl)-2,2-propane, bis(4-hydroxyphenyl)-phenylmethane, bis(4-hydroxyphenyl)-diphenylmethane, bis(4-hydroxyphenyl)-4'-chlorophenylmethane, bis(4-hydroxyphenyl)-2,2,2-trichloro-1,2-ethane, bis(4-hydroxyphenyl)-1,1-cyclohexane, bis(4-hydroxyphenyl)-cyclohexylmethane, 4,4'-dihydroxydiphenyl, 2,2'-dihydroxydiphenyl, dihydroxynaphthalene, bis(4-hydroxyphenyl)-2,2-butane, bis(3,5-dichloro-4-hydroxyphenyl)-2,2-propane, bis(2-methyl-4-hydroxyphenyl)-2,2-propane, bis(3-methyl-4-hydroxyphenyl)-1,1-cyclohexane, bis(2-hydroxy-4-methylphenyl)-1,1-butane, bis(2-hydroxy-4-tertbutylphenyl 2,2-propane, bis(4-hydroxhyphenyl)-1-phenyl-1,1-ethane, 4,4'-dihydroxy-3-methyldiphenyl-2,2-propane, 4,4'-dihydroxy-3-methyl-3'-isopropyldiphenyl-2,2-butane, bis(3,5-dibromo-4-hydroxhphenyl)-phenyl phosphine oxide, bis(4-hydroxphenyl)-sulfoxide bis(4-hydroxyphenyl)-sulfone, bis(4-hydroxyphenyl)-sulfonate, bis(4-hydroxyphenyl)-sulfide, bis(4-hydroxyphenyl)-methylamine, 2,3,5,6,2',3',5',6'-octachloro-4,4'-hydroxybiphenyl bis(3,5-dibromo-4-hydroxyphenyl)-ketone, and bis(3,5-dibromo-4-hydroxyphenyl)-2,2-propane.

In addition to the above recited para hydroxy bisphenols, the corresponding ortho and meta hydroxyl bisphenols can be employed in the process of this invention.

The glycol can be employed in any amount from 0 up to about 85 mol percent of the hydroxyl-containing component with the bisphenol constituting the balance. Preferably, the diol is 15–85 mol percent of the hydroxyl-containing component and most preferably about 50 mol percent. In general, the glycols will contain 2–40 carbon atoms and typical examples include ethylene glycol, diethylene glycol, triethylene glycol, tetraethylene glycol, propylene glycol, dipropylene glycol, polypropylene glycol, hexylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, 1,4-butanediol, 1,3-butylene glycol, neopentyl glycol, 1,2-dimethyl-1,2-cyclopentanediol, 1,2-cyclohexanediol, 1,2-dimethyl-1,2-cyclohexanediol, 2,2,4-trimethyl-1,3-pentanediol, polyethylene glycol, hydroxyl-terminated aliphatic polyesters of, e.g., about 1000 molecular weight, and the like.

In accordance with conventional procedure, any of those materials which are known to be catalysts for the condensation reaction may be employed in this invention. Such catalysts are bases such as tertiary amines such as trimethylamine, triethylamine, pyridine and the like. The base catalyzes the reaction and also neutralizes the hydrogen chloride that would otherwise be liberated during the condensation reaction. The catalyst (and HCl acceptor) is usually employed in twice the molar quantity of the diacid halide although a slight excess of up to about 15 molar percent, preferably 5-10 molar percent, is generally employed to ensure completeness of reaction and to compensate for any loss of volatile base.

Any of the known inert organic solvents can be used in the process of this invention. Suitable inert solvents include both aliphatic and aromatic hydrocarbons as well as simple and cyclic ethers. Typical hydrocarbons include isooctane and benzene fractions such as those having a boiling range of 120°-200° C. Cycloaliphatic compounds such as decahydronaphthalene are also suitable. Benzene, toluene, xylene, and isomeric mixtures of hexylcumene, cyclohexyltoluene, cyclohexylethyl benzene, isopropylethyl benzene, dihexyl benzenes, and diphenyl, and the like are examples of suitable aromatic hydrocarbons. The ethers include diisopropylether, diisoamylether, dimethylethers or ethylene and diethylene glycol, diphenylether, 1,4-dioxane, and the like. Also suitable are nitrobenzene, dimethyl sulfoxide and dimethyl formamide as well as chlorinated aliphatic and aromatic hydrocarbons such as methylene chloride, tetrachloroethane, tetrachloroethylene, pentachloroethane, o-dichlorobenzene, trichlorobenzene, $\beta,\beta$-dichloroethyl benzene, monochlorobenzene, and the like. The amount of solvent must be sufficient to avoid precipitation as the reaction proceeds. The diacid halide is employed in the form of a 1-25 weight percent solution, preferably 10-25 weight percent, in one of the foregoing solvents, although a more concentrated solution can be used if additional solvent is added as the reaction continues. The hydroxyl-containing component can be employed in the form of about a 15-100 weight percent solution (i.e., if the hydroxyl component is a liquid, it can be employed without solvent) and is preferably used as a 30-50 weight percent solution. Sufficient solvent is used to obtain a polyester concentration of 1-11% or more, depending on viscosity, and preferably about 5-10%.

The polymerization process is carried out using the standard solution polymerization techniques except that the hydroxyl-containing component together with the catalyst are added to the diacid halide, preferably with stirring. The addition is preferably performed slowly but this is not necessary if the heat of the exotherm is controlled by cooling via ice baths or solvent reflux. The particular temperatures maintained will depend on the diacid halide. For example, in the case of isophthaloyl chloride, a temperature of 0°-5° C. is suitable while with terephthaloyl chloride a temperature above 15° C. is used in order to maintain the terephthaloyl chloride in solution. In general, the reaction temperature will be from about 0° C. to the boiling point of the most volatile reaction component, and preferably about 0°-40° C. After the end of the addition period, which can last about 0.5-6 hours, preferably about 2-4 hours, a reaction or stirring period is preferably employed, usually lasting about 2-24 hours, depending on the reactivity of the hydroxyl-containing component with the diacid halide. The faster the reaction occurs, the less stirring or reaction time is necessary to ensure completeness of reaction. Thereafter any amine hydrohalide solids can be filtered out of the solution, or the solution can be quenched with dilute hydrochloric acid, washed with distilled water until the washings are free of chloride and filtered. The polymer can then be recovered by the addition of an anti-solvent such as acetone, by addition of the polymer solution to a non-solvent or by the addition of the polymer solution to warm or hot water under high agitation in cases where the solvent has a boiling point below that of water.

When a mixture of hydroxyl-containing components is employed, they are added to the diacid halide simultaneously, preferably dissolved in a common solvent.

The color of the composition of this invention is improved by excluding oxygen from the reaction vessel. Phenols and bisphenols upon slight oxidation discolor to a deep red. Since pronounced colors are hard to mask, the polymer to be most useful should be colorless or nearly colorless. Therefore, an inert or unreactive gas is employed to exclude oxygen from the reaction vessel. While it has been convenient to use nitrogen, suitable unreactive gases or mixtures can be employed including the inert gases such as argon, helium and neon.

The process of this invention produces high molecular weight polymers with low melt viscosities which make the polymers suitable for use as engineering plastics, e.g., in the preparation of films and fibers and molded articles. Without being limited to theory, we believe tha the reason low molecular weight polymers with high melt viscosities are produced when the diacid halide is added to the hydroxyl-containing component is that the more reactive species such as the bisphenols react immediately with the diacid halides forming block polymers which due to crystallinity and/or molecular size become insoluble in the solvent and precipitate out of solution disrupting the stoichiometry. Bisphenol-A terephthalates are known to be highly insoluble, very high melting polymers which exhibit high melt viscosities at normal processing temperatures which are generally at or below the melting point of the bisphenol-A terephthalate polymer. The reverse addition process of this invention always assures an excess of the diacid halide which minimizes the formation of block polyesters and copolyesters.

The following Examples are presented in order to further illustrate the present invention. In the Examples, as well as throughout the specification and claims, all parts and percentages are by weight, all temperatures in degrees Centrigrade, and all intrinsic viscosities were determined in 1,1,2,2-tetrachloroethane at 30° C. unless otherwise specified.

EXAMPLE 1

A poly(neopentylene-4,4'-isopropylidene diphenylene terephthalate 50:50) was prepared by an interfacial polymerization method. Terephthaloyl chloride (4.7995 moles) and neopentyl glycol (2.3965 mols) were charged into a 5-liter 3-necked flask equipped with a stirrer and a nitrogen inlet and outlet. A continuous flow of dry nitrogen was passed through the reaction flask while stirring and the flask was heated by means of an electrical heating mantle for 7 hours 25 minutes to a maximum temperature of 80° C. 86% of the theoretical quantity of hydrogen chloride had evolved at the end of the heating period. The reaction product was cooled to 40° C. and transferred to a 10 gallon glass-linked Pfaudler reactor which contained dry methylene chloride (20 pounds). The stirrer in the reactor was set at 500 rpm and the reactor temperature was set at 22° C. Water (2.0 pounds) and benzyltriethylammonium chloride (18 g) were charged into the glass-lined reactor. A solution of bisphenol-A (2.4704 mols)), NaOH (6.3 mols) and deionized water (10 pounds) was prepared in a separate vessel and added to the Pfaudler reactor containing the methylene chloride solution of the neopentyl glycol-terephthaloyl chloride reaction product at a rate of about 200 ml per minute. After the bisphenol-A solution had been added (approximately 25 minutes), additional methylene chloride (10 pounds) was charged into the reactor and the mixture agitated for 25 minutes at a reactor temprature of 22° C. A continuous flow of nitrogen was maintained during the interfacial reaction. Concentrated aqueous hydrochloric acid (360 ml) was added to the reaction mixture followed by the addition of methylene chloride (30 pounds). The stirring was lowered to 150 rpm and the mixture agitated for at least an additional 10 minutes.

The reaction mixture was then transferred to a stainless steel mixing tank equipped with a Lightning mixer and a cover containing deionized water (20 gallons). The Pfaudler reactor was rinsed with methylene chloride (30 pound) and the rinse solution added to the stainless steel tank. The solution was agitated slowly for 10 minutes, the agitator turned off and the mixture allowed to separate into two layers. The upper aqueous layer was removed and the washing process repeated using distlled water (5 gallons) until the washings were chloride free. The methylene chloride solution of the polymer was filtered and the volume of the solution was reduced to about ¼ of the original by distillation. The solid copolyester was precipitated in excess acetone, washed with acetone and dried in a vacuum oven. There was obtained 2.3 pounds 73.3% of theory) of solid dry material. The pertinent reaction parameters and properties of this product are listed in Table I.

EXAMPLE 2

A poly(nepentylene-4,4'isopropylidene diphenylene terephthalate 50:50) prepared by the interfacial route was found by NMR analysis to have a random structure. Other pertinent reaction parameters and physical properties of this product are listed in Table I.

EXAMPLES 3-4

Two poly(neopentylene-4,4'-isopropylidene diphenylene terephthalate 50:50) copolymers were prepared by the interfacial process. The pertinent reaction parameters and properties of these materials are listed in Table I.

EXAMPLE 5

A poly(ethylene-4,4'-isopropylidene diphenylene isophthalate 50:50) was prepared by a standard solution polymerization method. A mixture of dried bisphenol-A (0.20 mol), dried and distilled ethylene glycol (0.20 mol), dried and distilled triethylamine (0.88 mol) was charged into a 3-liter 3-necked Morton flask in a dry box. The flask, equipped with a mechanical stirrer, thermometer, reflux condenser with attached drying tube, an inert gas inlet and a pressure equalized addition funnel, was immersed in an ice bath while maintaining the ingredients inside the flask under agitation and a constant dry nitrogen atmosphere. A solution of distilled isopthaloyl chloride (0.40 mol) in dry methylene chloride (162 ml) was added through the pressure equalized addition funnel over a 2 hour 10 minutes period at a temperature in the range of 0°-4° C. The mixture was stirred for an additional 2 hours at a temperature of −2° to 5.5° C. The mixture was filtered to remove undissolved triethylamine hydrochloride, and washed several times with distilled water until the washings were free of chloride ions. The solution was diluted to a volume of 2 liters with methylene chloride to facilitate the washing step. The solution was dried over $MgSO_4$ and the solvent was removed on a Rinco evaporator. The yield was 38% of theory. The product was a white, slightly yellowish brittle material. The pertinent reaction parameters and properties of this product are given in Table I.

EXAMPLE 6

A poly(ethylene-4,4'-isopropylidene diphenyl isophthalate 50:50) was prepared by the process of this invention. A solution of distilled isophthaloyl chloride (0.40 mol) in dried and distilled methylene chloride (162 ml) was charged into a 3-liter 3-necked flask in a dry box. The flask was equipped in the same manner as described in Example 5. The flask was immersed in an ice bath while maintaining the solution inside under constant dry nitrogen atmosphere with stirring. A solution of dried bisphenol-A (0.20 mol), dried and distilled ethylene glycol (0.20 mol) and dried and distilled triethylamine (0.88 mol) in dried and distilled methylene chloride (840 ml) was added to the isophthaloyl chloride solution in the flask with stirring over a 6 hour period at temperatures of −2° to 2° C. The mixture was stirred for an additional 20 minutes and then diluted with methylene chloride (500 ml). Concentrated hydrochloric acid (6 ml) diluted with distilled water (110 ml) was added to the reaction mixture followed by a further addition of distilled water (500 ml). The solution was washed with distilled water until the washings were free of chloride ions. Removal of all of the solvents on a rotoevaporator could not be completely accomplished due to the rubbery nature of the copolyester, therefore, the product was redissolved in methylene chloride and precipitated in n-hexane yielding a white, fluffy material which amounted to 78% of the theoretical yield. A small portion of the solution was completely desolvenated by evaporation. The pertinent reaction parameters and properties of these products are listed in Tables I and II.

EXAMPLE 7

A poly(neopentylene-4,4'-isopropylidene diphenylene terephthalate 50:50) was prepared by the process of this invention. A solution of distilled terephthaloyl chloride (0.40 mol) in distilled methylene chloride (195 ml) was prepared in a 3-liter 3-necked flask which was equipped in the manner as described in Example 5. The flask was immersed in an ice bath, however, the temperature of the solution was maintained above 15° C. to prevent the precipitation of the terephthaloyl chloride. The solution was kept under a constant dry nitrogen atmosphere with stirring. A solution of recrystallized bisphenol-A (0.20 mol), recyrstallized neopentyl glycol (0.20 mol) and distilled triethylamine (0.88 mol) in distilled methylene chloride (500 ml) was added to the terephthaloyl chloride solution over a 6.5 hour period at temperatures of 15°-21.5° C. while maintaining a medium rate of stirring. The addition funnel was rinsed with methylene chloride (200 ml). The reaction mixture was stirred for an addition 2 hour period at temperatures of 18°-23° C. The mixture was filtered to remove triethylamine hydrochloride. Methylene chloride (400 ml) was used for rinsing. The solution was washed with distilled water, treated with activated carbon, dried over MgSO₄ and filtered. The solid polymer was recovered by precipitation by addition to acetone as a nonsolvent. The yield of the final dried polymer was 68.4% of theory. NMR analysis of the copolyester indicated that the polymer had a random structure. The pertinent reaction parameters and properties of the copolyester are given in Tables I and II.

EXAMPLES 8-11

Four additional high molecular weight linear aromatic polyesters were prepared by the process of this invention, i.e., by the addition of the hydroxyl-containing component to the diacid halide, following the general procedure of Example 6. The reaction parameters and results are given in Tables I and II.

EXAMPLE 12

Commercial terephthaloyl chloride (0.50 mol) and distilled isophthaloyl chloride (0.50 mol) was charged into a 5-liter 3-necked Morton flask equipped in the same manner as described in Example 5. Methylene chloride (3000 ml) which had been dried over molecular sieves, was added to the flask. The flask was immersed in an ice bath but the temperature was kept at 15° C. or higher to prevent precipitation of terephthaloyl chloride. The solution was kept under constant dry nitrogen with stirring. Bisphenol-A used in this experiment was found by analysis to contain 0.015% water. No effort was made to remove this water; instead, the charge of the bisphenol-A was increased by a factor of 1.00015 to compensate for the moistur in the bisphenol-A. A solution of p-t-butylphenol (0.00418 mol) (used as a chain stopper), bisphenol-A (0.99806 mol charged to yield a true charge of 0.99791 mol), dried and distilled triethylamine (2.100 moles) and dried and distilled methylene chloride (300 ml) was added to the diacid chloride solution over a 31 minute period with stirring and at temperatures of 15°-21.5° C. The addition funnel was rinsed with methylene chloride (200 ml). The reaction mixture was stirred for an additional 11.7 hours. Samples were withdrawn periodically and quenched immediately with a dilute aqueous solution of hydrochloric acid. The polymer was recovered by precipitation in hot distilled water in a Waring blender. The precipitated polymer was washed once with hot distilled water and once with cold distilled water in the Waring blender. The final wash was free of chloride ions. The polymer had dried in a vacuum oven and the intrinsic viscosities determined in sym-tetrachloroethane at 30° C. The results are set forth in Table III.

TABLE III

| Reaction Time (Hours) | Intrinsic Viscosity dl/g | Glass Transition Temperature ° C |
|---|---|---|
| 0.25 | 0.93 | 199 |
| 1.0 | 0.90 | — |
| 2.0 | 0.92 | — |
| 3.0 | 0.91 | — |
| 4.0 | 0.94 | 199 |
| 11.7 | 0.89 | — |

EXAMPLE 13

Commercial terephthaloyl chloride (0.33 mol), distilled isophthaloyl chloride (0.67 mol) and dry methylene chloride (3000 ml) were charged into a 5-liter 3-necked Morton flask which was equipped in the same manner as described in Example 5. A solution of p-t-butylphenol (0.02564 mol) and dried and distilled triethylamine (0.038 mol) in dry methylene chloride (50 ml) was added to the diacid chloride solution with stirring over 18 minutes at 19°-20° C., and the mixture allowed to react for 57 minutes at 19°-21° C. A solution of bisphenol-A (charged 0.98733 mol to yield an actual charge of 0.98718 mol in order to compensate for the moisture in the bisphenol-A) and dried and distilled triethylamine (2.07 mols) in dry methylene chloride (300 ml) was added to the reaction mixture with stirring over 62 minutes at 15°-21.3° C. The addition funnel was rinsed with dry methylene chloride (200 ml). All additions and reactions were carried out under a constant flow of dry nitrogen into the reaction flask. The reaction mixture was stirred for 3 hours at 21.3°-23° C. transferred to a flask equipped with a bottom stopcock and quenched by addition of concentrated by hydrochloric acid (12.5 ml) which had been diluted with distilled water (700 ml). The quenched reaction mixture was stirred for 5-10 minutes, the water layer which separated after the stirring was stopped was removed and the polymer recovered by precipitation in hot water in a Waring blender. The precipitated polymer was washed once with hot distilled water and once with cold distilled water. The final was was free of chloride ion. The polymer was dried in a vacuum oven at 115°-125° C. There was obtained a white fluffy polymer in 98.2% yield. The intrinsic viscosity of the polymer in symtetrachloroethane was 0.61 dl/g.

TABLE I

| Example[1] | Reactants[2] | Amine[3] Type | Molar Excess | Addition Time Hrs. | Addition Temp. ° C. | Additional Stirring Time Hrs. | Additional Stirring Temp. ° C. | Percent Polymer Solids | Isolation Method |
|---|---|---|---|---|---|---|---|---|---|
| 1 (IF) | 50/50 BPA/NPG-TP | — | — | — | — | — | — | 4.2 | ppt in acetone |
| 2 (IF) | 50/50 BPA/NPG-TP | — | — | — | — | — | — | — | ppt in acetone |
| 3 (IF) | 50/50 BPA/NPG-TP | — | — | — | — | — | — | — | ppt in acetone |
| 4 (IF) | 50/50 BPA/NPG-TP | — | — | — | — | — | — | 4.6 | ppt by acetone |
| 5 (NSP) | 50/50 BPA/EG-IP | TEA | 10% | 2.1 | 0 to 4 | 2 | −2 to 5.5 | 7.6 | evaporation |
| 6 | 50/50 BPA/EG-IP | TEA | 10% | 6.0 | −2 to 2 | 0.33 | −1.3 to 0.8 | 5.2 | evaporation |
| 6A | Polymer of Example 6 redissolved in methylene chloride | | | | | | | | ppt in hexane |
| 7 | 50/50 BPA/NPG-TP | TEA | 10% | 6.5 | 15 to 21.5 | 2 | 18 to 23 | 7.0 | ppt by acetone |
| 8 | 25/75 BPA/EG-IP | TEA | 10% | 7.5 | −9 to 4 | 2 | −5 to 0.2 | 3.9 | ppt in hexane |
| 9 | 75/25 BPA/EG-IP | TEA | 10% | 7.0 | −8 to 1.5 | 2 | 1.5 to 4 | 5.6 | ppt by acetone |
| 10 | 50/50 BPA/NPG-TP | P | 5% | 5.33 | −2 to 2 | 0.5 | Reflux | 7.5 | ppt by acetone |
| 11 | 50/50 BPA/NPG-TP | P | 5% | 5.33 | −2 to 2 | 0.5 | Reflux | 7.5 | ppt in hexane |

[1]IF means interfacial method; and NSP means normal solution procedure.
[2]BPA is bisphenol-A, NPG is neopentyl glycol, EG is ethylene glycol, TP is terephthaloyl chloride, IP is isophthaloyl chloride, and the numbers represent the molar ratio within the hydroxyl component.
[3]TEA is triethylamine, P is pyridine, molar excess refers to amount of the amine beyond 2 mols per mol of TP or IP.

TABLE II

| Example | GPC DATA[1] Mn | Mw | Mw/Mn | $[\eta]$[2] | Tg, °C[3] | Microtensile Impact Strength, Inch-Pounds[4] | Melt Viscosity at 300° C Actual | Normalized to $[\eta] = 0.70$ |
|---|---|---|---|---|---|---|---|---|
| 1 | 26,400 | 62,500 | 2.37 | 0.80 | 130 | 9.4 (6.5–11.6) | — | — |
| 2 | 34,300 | 79,900 | 2.33 | 0.73 | — | — | 97,000 | 54,000 |
| 3 | — | — | — | 0.78 | 139 | — | 77,000 | 54,000 |
| 4 | — | — | — | 0.59 | — | — | 20,300 | 54,000 |
| 5 | 9,300 | 14,000 | 1.50 | 0.36* | — | — | — | — |
| 6 | 38,300 | 75,000 | 1.96 | — | — | — | — | — |
| 6A | 39,800 | 83,300 | 2.09 | 0.76 | 118.5 | 1.8 (1.1–2.2) | — | — |
| 7 | 38,500 | 70,900 | 1.84 | 0.83 | 137 | 9.8 (7.1–>12) | 126,000 | 54,000 |
| 8 | 27,200 | 52,700 | 1.94 | 0.42 | 77 | 0.8 (0.5–1.1) | — | — |
| 9 | 64,100 | 122,000 | 1.91 | 1.10* | 154 | 5 | — | — |
| 10 | 31,300 | 49,500 | 1.58 | 0.62 | 128 | 8.9 (5.6–>12) | — | — |
| 11 | 13,500 | 41,200 | 2.23 | 0.53 | 129 | — | — | — |

[1]Gel Permeation Chromatography: Mn is number average molecular weight and Mw is weight average molecular weight. Values were obtained using a polystyrene calibration curve and therefore are not absolute but relate to each other.
[2]Intrinsic viscosity at 25° C. except those values with an asterisk which represent 1 point determination at 30° C.
[3]Glass transition temperature by differential scanning calorimetry.
[4]Several molded specimens were made with each polyester at 280° C. The high and low values in each series are given within the parenthesis and the average is given outside the parenthesis.
[5]This polymer could not be molded at 280° C. but can be used for preparation of films and fibers.

Various changes and modifications can be made in the process of this invention without departing from the spirit and the scope thereof. The various embodiments disclosed herein were for the purpose of further illustrating the invention but were not intended to limit it.

We claim:

1. In the solution polymerization process for the preparation of linear aromatic polyesters by reacting an organic diacid halide with a hydroxyl containing component in the presence of a catalyst, the improvement which comprises adding a hydroxyl-containing component comprising a mixture of a bisphenol and a glycol, to the diacid halide wherein the diacid halide is terephthaloyl chloride, isophthaloyl chloride or a mixture thereof, and wherein the hydroxyl-containing component is 15–85 mol percent of a glycol of 2–20 carbon atoms and a bisphenol of the formula $$\text{HO}-\underset{T_b}{\text{Ar}}-\underset{G_m}{E_d}-\underset{T_b}{\text{Ar}}-\text{OH}$$

in which Ar is aromatic, each T is independently selected from the group consisting of halogen, G or OG, each G is independently selected from the group consisting of alkyl, aryl, haloaryl, haloalkylaryl, alkylaryl, cycloalkyl, halocycloalkyl, and haloalkyl, E is a bivalent alkylene, haloalkylene, cycloalkylene, halocycloalkylene, arylene, haloarylene, —O—, —S—, —SO—, —SO₂—, —SO₃—, —CO—,

or GN<, m is 0 to the number of replaceable hydrogen atoms on E, each b is 0 to the number of replaceable hydrogen atoms on Ar, and d is 0 or 1.

2. The process of claim 1 wherein in said bisphenol formula, Ar contains 6–18 carbon atoms, G contains 1–14 carbon atoms, and E contains 1–14 carbon atoms.

3. The process of claim 1 wherein in said bisphenol formula, Ar is phenyl, E is alkylene, G is alkyl, d is 1, and m is 2.

4. The process of claim 1 wherein the hydroxyl-containing component is bisphenol-A.

5. The process of claim 4 wherein said glycol is neopentyl glycol or ethylene glycol.

6. The process of claim 1 wherein said solution polymerization process is effected at a temperatures of about 0° C to the boiling point of the most volatile reaction component.

7. The process of claim 6 wherein said solution polymerization process is effected at a temperature of about 0°–40° C.

8. The process of claim 1 wherein the diacid halide is employed in the form of a 1–25 weight percent solution.

* * * * *